United States Patent [19]

Hanson

[11] Patent Number: 4,824,004

[45] Date of Patent: Apr. 25, 1989

[54] APPARATUS AND METHOD FOR FORMING A PALLET

[76] Inventor: Garry L. Hanson, 3407 138th La. NW., Anoka, Minn. 55304

[21] Appl. No.: 120,586

[22] Filed: Nov. 13, 1987

[51] Int. Cl.$^4$ .............................................. B27F 7/09
[52] U.S. Cl. .................................. 227/152; 29/281.3; 29/716; 29/798; 269/910
[58] Field of Search ................ 29/281.1, 281.3, 281.5, 29/432, 772, 798, 709, 714, 715, 716; 227/45, 152; 269/910

[56] References Cited

U.S. PATENT DOCUMENTS

| | | | |
|---|---|---|---|
| 3,968,560 | 7/1976 | Vial | 227/45 X |
| 4,111,114 | 9/1978 | Carr | 227/152 X |
| 4,235,005 | 11/1980 | James | 227/152 X |
| 4,394,952 | 7/1983 | Crane | 227/45 X |
| 4,492,016 | 1/1985 | Smets et al. | 29/798 X |

Primary Examiner—Timothy V. Eley
Assistant Examiner—Frances Chin
Attorney, Agent, or Firm—Lawrence M. Nawrocki

[57] ABSTRACT

A machine (20) forming of pallets by affixing deck boards (52) to two or more stringers (50). The apparatus includes a base (22) defining a bed which has input and output sections. An inverter (28) is pivotally mounted to the base (22) for pivotal movement between a first position, overlying the input section, and a second position, overlying the output section. With the inverter (28) in its first position, a pallet is partially formed by affixing a plurality of deck boards (52) to first sides of two or more stringers (50) while those pallet components (50, 52) are held within fittings (56, 62, 64, 66, 68) carried by the inverter (28). Affixation is effected by a tower (86), having a plurality of nailer guns (100), moving across the inverter (28). With the pallet thus partially formed, the inverter (28) pivots to its second position to deposit the partially formed pallet into the output section at which the partially formed pallet and deck boards (52) to be affixed to the other sides of the stringers (50) are held in position by various fittings (74, 78, 80, 82). As the deck boards (52) are applied to the stringers (50) in the output section, deck boards (52) and stringers (50) are positioned within various fittings carried by the inverter (28), which has been returned to its first position. With the pallet components positioned in the input and output sections of the apparatus (20), the tower (86) is, again, caused to be moved across the apparatus (20) to effect nailing of the various deck boards (52) to the stringers (50). Pallets are continued to be assembled in this fashion as desired.

7 Claims, 6 Drawing Sheets

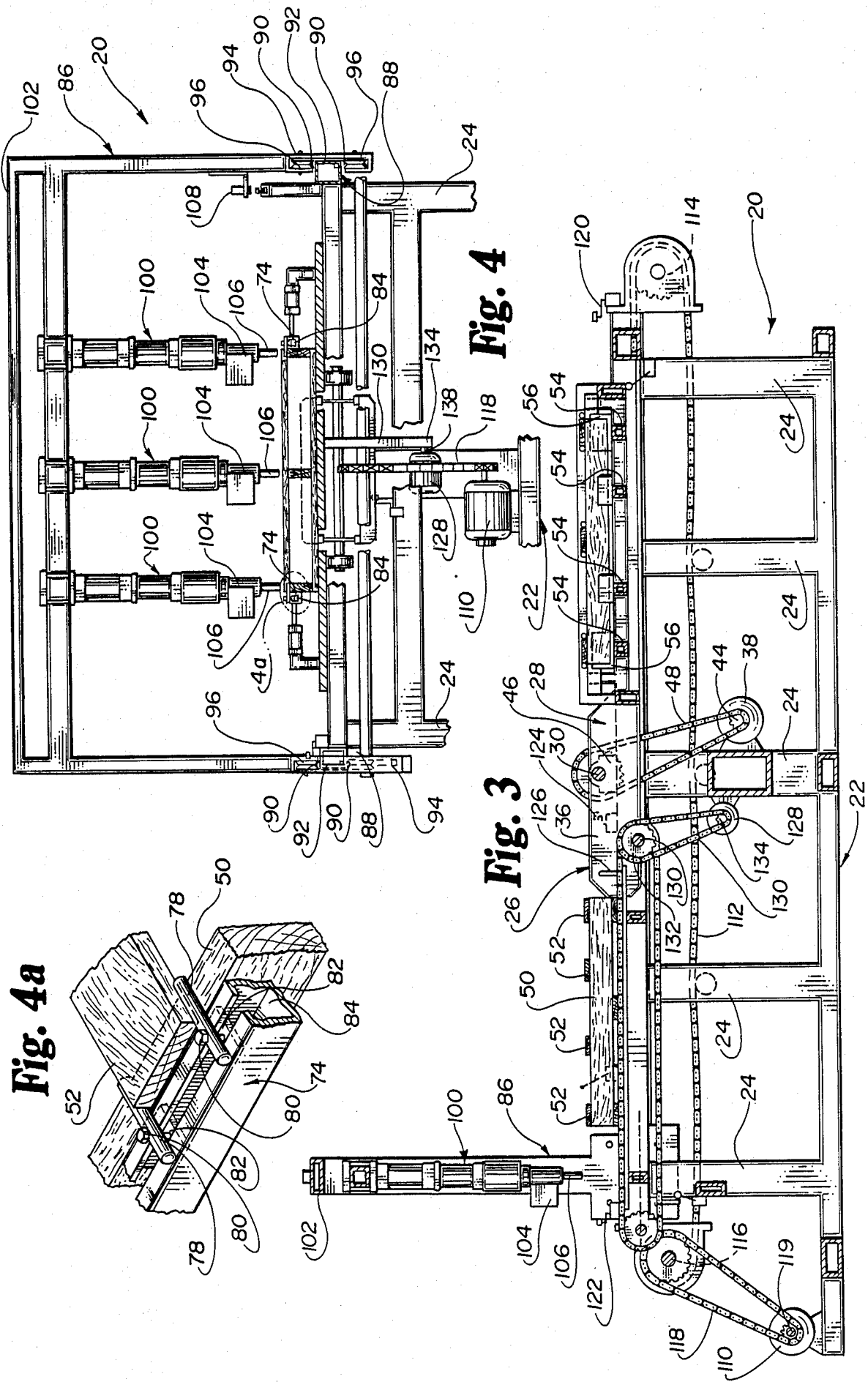

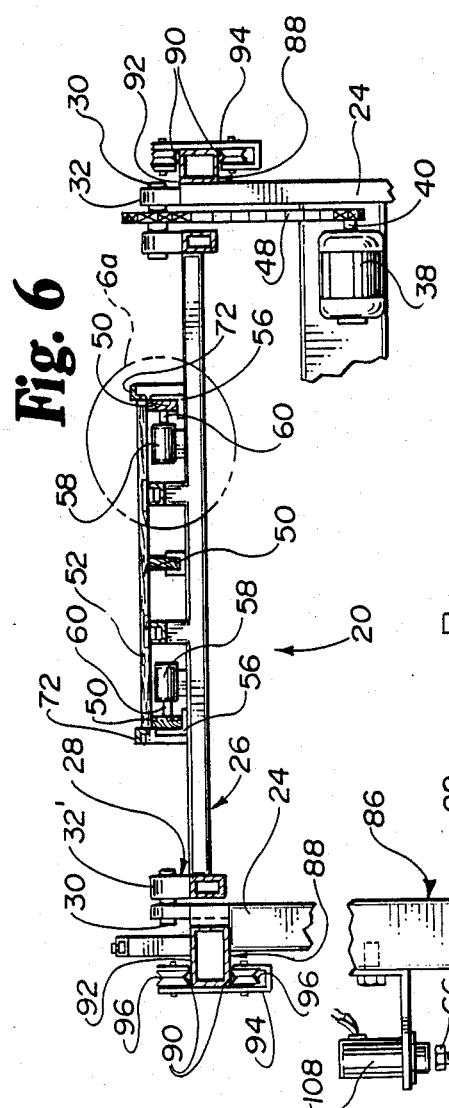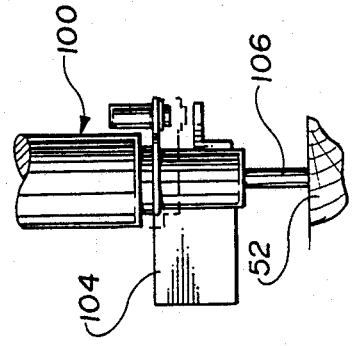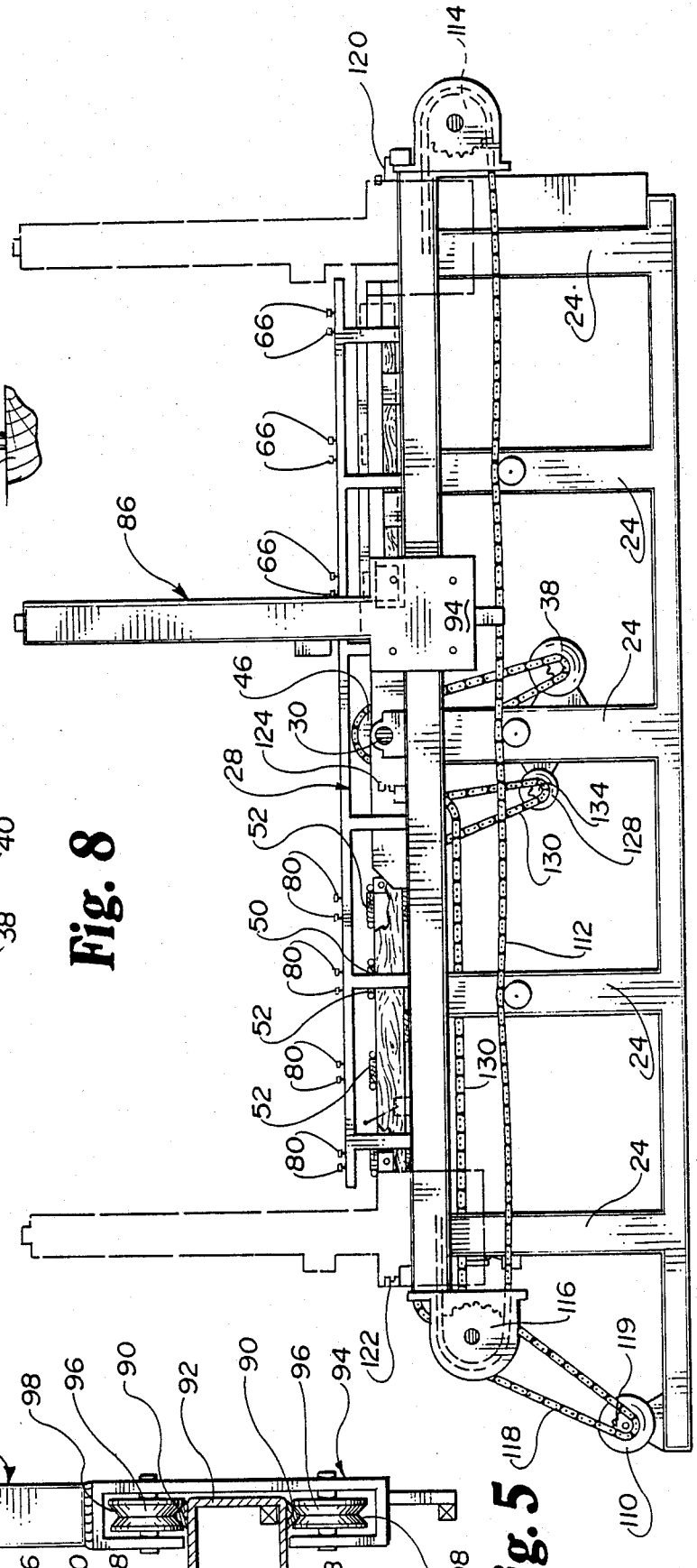

APPARATUS AND METHOD FOR FORMING A PALLET

TECHNICAL FIELD

The present invention deals broadly with the field of forming equipments. More narrowly, however, the invention deals with the field of pallet forming equipments. Specifically, the invention is related to a technology wherein pallets are formed quickly and efficiently and in a relatively confined space.

BACKGROUND OF THE INVENTION

Merchandise assembly and storage is a significant aspect of wholesale and retail sales. Any particular product item is, typically, packaged with a defined number of units in a relatively small carton. A number of cartons are, thereafter, assembled and stacked for shipment in commerce.

Because of the typical volume of space occupied by assembled and stacked cartons, pallets are employed to underlie a number of cartons so that movement of large quantities of items can be effected simply. Such pallets must be economical in construction, yet durable and versatile in their functioning.

Pallets employed for a purpose as previously described, typically, employ a standard construction. That construction utilizes a few stringer boards which are spaced from one another and made to extend generally parallel to one another. The stringer boards are oriented with faces thereof in opposed relationships so that their edges define a pair of parallel planes.

With the stringer boards so disposed, a plurality of deck boards are secured to first edges of the stringers defining a first plane. Thereafter, a plurality of deck boards are secured to second edges of the stringers defining a second, parallel plane.

In manufacturing pallets, a number of factors can be critical. While large-scale manufacturers may not be limited by space, smaller manufacturers seeking to compete in the market may not have unlimited space available. Depending upon the size of the pallet intended to be manufactured, space requirements can be fairly extensive.

Another, and probably more important, factor involved is the need to process the assembly of pallets as expeditiously as possible. It can often be the case that the ability to mass produce large numbers of pallets will either make or break a company.

Often, these two factors dovetail. That is, they are interrelated, one depending upon the other. For example, if unlimited space is available, a continuous assembly line might be able to be established, the assembly line having a multiplicity of stations at which various steps can be performed in the manufacturing of pallets. When virtually unlimited space is available, it might well be that pallets can be mass produced quickly and efficiently.

This might not be the case where only limited space is available, however. In close quarters, a manufacturer might be required to delay the manufacturing process in order to enable the completion of the various steps necessary to be performed in forming pallets.

It is to these considerations and problems of the prior art that the present invention is directed. It comprises both apparatus and a method for forming a pallet which improve over apparatus and methods known in the prior art.

SUMMARY OF THE INVENTION

The present invention comprises apparatus for forming a pallet wherein a plurality of stringer boards and a plurality of deck boards are employed to construct the pallet. As is done in the prior art, the deck boards are secured to each of opposite sides of the stringer boards. The apparatus includes a deck or bed having an input section and an output section. The output section is spaced linearly from the input section along an axis of the bed. Means are provided for inverting a partially assembled pallet. Such means are disposed for pivotal movement between a first position, overlying the input section, and a second position, overlying the output section. The inverter device carries means for mounting a plurality of stringer boards and a plurality of deck boards to be applied to a first side of the stringer boards, when the inverter is in its first position overlying the input section. The output section includes tooling for receiving a partially formed pallet from the inverter when the inverter is pivoted from its first position to its second position. The tooling, further, receives additional deck boards to be applied to a second side of the stringer boards. The apparatus also includes means for pivoting the inverter from its first position to its second position and means, reciprocable along the axis of the bed, for securing deck boards to both the first sides of stringer boards in the input section, and deck boards to second sides of stringer boards of a partially formed pallet deposited in the output section.

As will be able to be seen then, in view of this disclosure, movement of the securing means in a single direction will pass over both the input section and output section so that deck boards can be secured to first sides of stringer boards in the input section to partially form a pallet, and so that deck boards can be secured to second sides of the stringer boards of a previously partially formed pallet in order to complete the pallet. In a preferred embodiment, the apparatus further includes a conveyor for transferring a pallet completed in the output section of the bed away from the equipment.

It is envisioned that the input section would be closely proximate the output section. A partially formed pallet in the inverter with the inverter in its first position overlying the input section can, thereby, be quickly deposited into the output section. The inverter is, thereafter, returned to its first position overlying the input section.

The preferred embodiment employs a transfer carriage carrying a plurality of nailer guns as the means by which the deck boards are secured to the stringer boards. The transfer carriage of this embodiment is elongated and oriented generally transverse to the axis of the bed of the apparatus. The nailer guns are spaced along an axis of elongation of the transfer carriage and can, thereby, define paths parallel to one another in a direction generally parallel to the axis of the bed.

The present invention also includes a method. The method includes a step of providing an inverter frame and pivotally mounting that frame for movement between first and second positions of the inverter. The first position defines a first station, and the second position defines a second station. A plurality of stringer boards are positioned on an upwardly-facing side of the frame when it is in its first position, and a plurality of deck boards are positioned over the first sides of the stringer boards. Means, reciprocable along an axis along which the first and second stations are aligned, are provided for securing the deck boards to the stringer boards as reciprocation is effected. The securing means are, thereafter, moved along the axis along which the first and second stations are aligned to secure the deck boards to the first side of the stringer boards to partially form a pallet at the first station.

The partially formed pallet is then deposited in the second station in a position inverted with respect to the position it occupied in the first station. This is accomplished by pivoting the inverter frame onto which the partially formed pallet is mounted.

The frame is, thereafter, returned to its first position overlying the first station. Additional stringer boards and deck boards are, thereafter, mounted on an upwardly-facing side of the frame when the frame is again in its first position. A second plurality of deck boards are placed over the second sides of the stringer boards of the partially formed pallet in the second station. The securing means is then moved along the axis along which the first and second stations are aligned in a single pass to secure the deck boards to the first sides of the stringer boards in the first station, and to complete the pallet in the second station by securing the deck boards to the second sides of the stringer boards of the partially formed pallet.

The present invention is thus an improved apparatus and method for forming pallets. More specific features and advantages obtained in view of those features will become apparent with reference to the DETAILED DESCRIPTION OF THE INVENTION, appended claims, and accompanying drawing Figures.

BRIEF DESCRIPTION OF THE DRAWING

FIG. 3 is a side sectional view taken generally along the line 3—3 of FIG. 2;

FIG. 4 is an end elevational view, some parts cut away and other parts being removed;

FIG. 4a enlarged fragmentary pictorial detailed view of a typical jig arrangement as used in the second station;

FIG. 5 is a fragmentary end elevational detail taken generally along the line 5—5 of FIG. 1;

FIG. 6 is a sectional elevational view taken along line 6—6 of FIG. 2;

FIG. 7 is a fragmentary detailed view of the distal end of one nailer gun;

FIG. 8 is a side elevational view illustrating the securing means in various positions along its path of reciprocation;

DETAILED DESCRIPTION OF THE INVENTION

Figure 1:
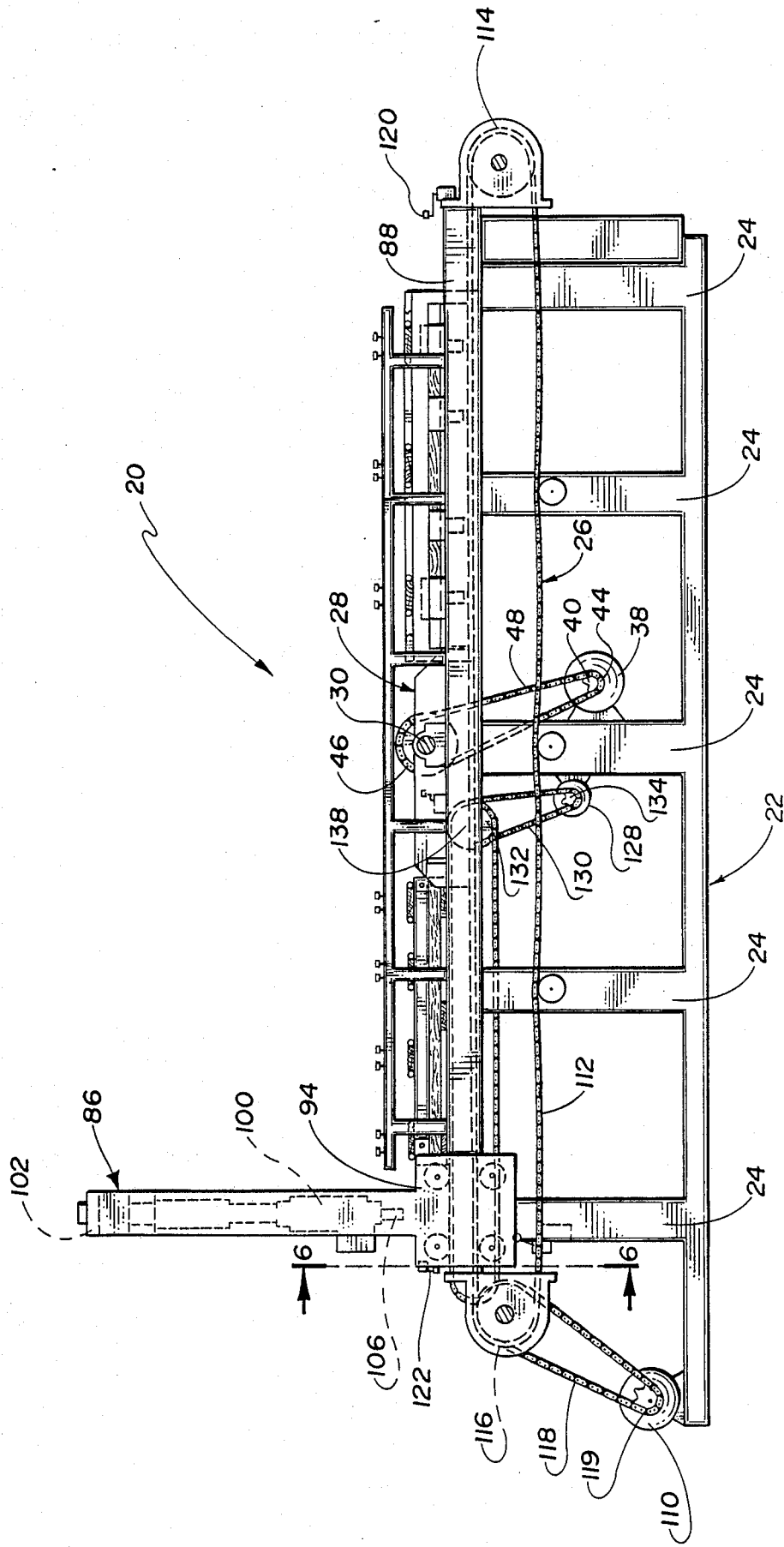
FIG. 1 is a side elevational view of an apparatus in accordance with the present invention.

Referring now to the drawings wherein like reference numerals denote like elements throughout the several views, FIGS. 1 and 3 illustrate, in side view, an apparatus 20 in accordance with the present invention. The apparatus 20 includes a base 22 which can be, as seen particularly in FIG. 3, formed from rectangular cross-section tubular stock.

As seen in the Figures, a number of generally vertically oriented standards 24 extend upwardly from the base 22. It is envisioned that these standards 24 would be formed from the same type of stock as is the base 22.

The figures illustrate the employment of ten such standards 24 (five along each side of the equipment). It will be understood, however, that any appropriate number sufficient to give necessary support to a table 26 and related apparatus (as will be seen hereinafter) could be employed.

Upper ends of the standards 24 support a table or bed 26. The bed 26 comprises a working area at which pallets are actually assembled.

A pivotably mounted inverter mechanism 28 is supported at the bed level and is disposed for pivoting between first and second positions. The inverter mechanism 28 is mounted for pivoting with respect to a pair of trunnions 30, one mounted on either side of the bed 26. The inverter 28 is, thereby, disposed from movement about an axis between a first position defining a first station (at the right of the bed 26 as seen in the figures) and a second position defining a second station (to the left of the bed 26 as seen in the figures).

Figure 2:
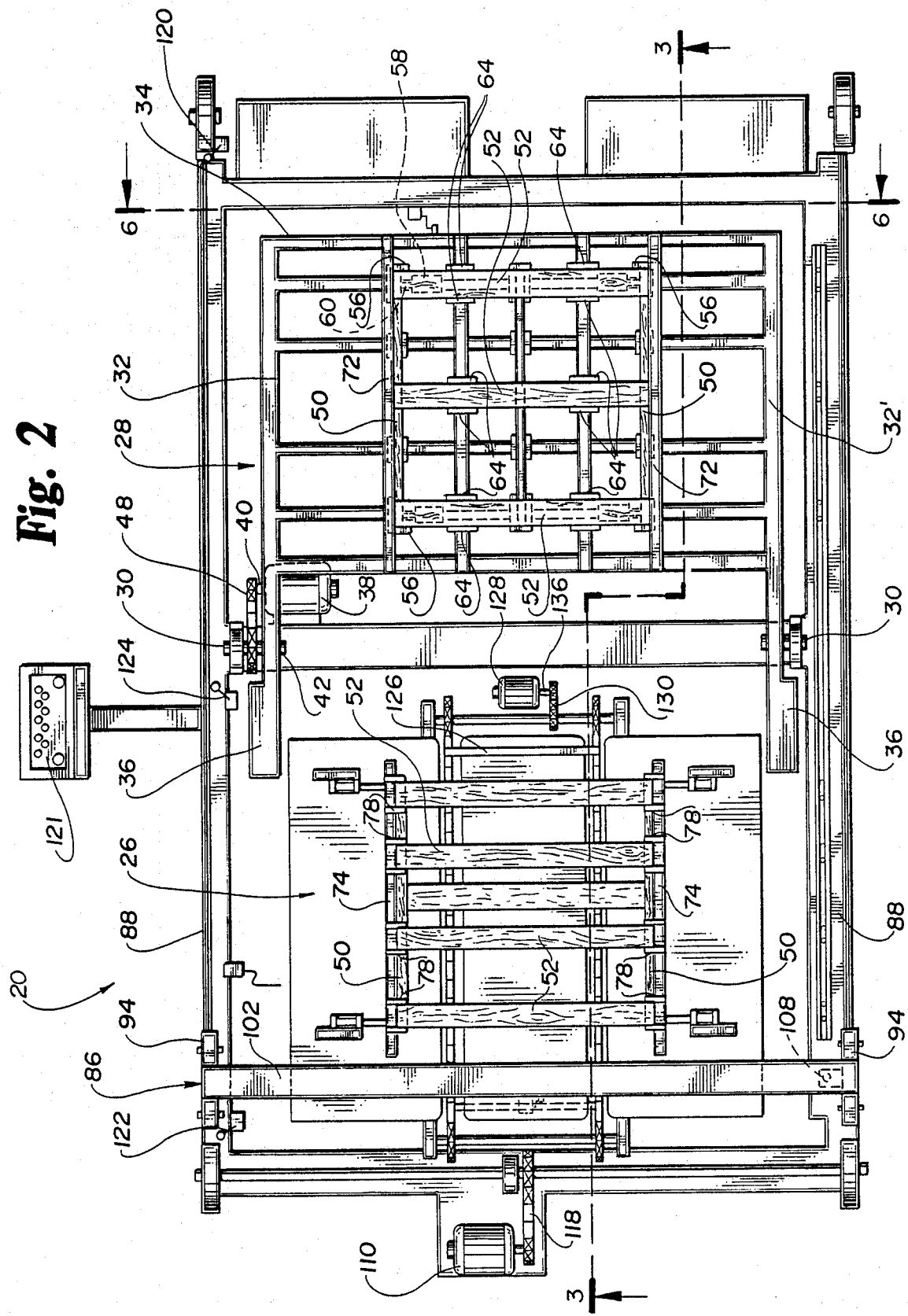
FIG. 2 is a top plan view of the apparatus of FIG. 1.

As seen in the plan view illustration of FIG. 2, the inverter 28 is generally U-shaped in configuration. That is, it employs a pair of arms 32, 32' interconnected at ends thereof, distal with respect to ends at which the arms 32, 32' are mounted for pivoting, by a transverse member 34.

One or both of the arms 32, 32' can be provided, at their pivotably mounted ends, with a counterweight or counterweights 36. These counterweights 36 would be disposed on a side of the pivot axis opposite that on which the bulk of the inverter member 28 is disposed. The weight of the inverter 28 can, thereby, be made more neutral and pivoting be effected more easily.

Pivoting is effected by a motor 38 provided with an appropriate horsepower in view of the size, shape, and weight of the inverter 28. Shafts 40, 42 of the motor 38 and the inverter 28 are provided with sprockets 44, 46, and an endless chain 48 is extended about the sprockets 44, 46 to transmit rotation of the motor shaft 40 to that 42 of the inverter 28.

A side of the inverter 28 which faces upwardly when the inverter 28 is in its first position overlying the first station is provided with jigs for mounting a plurality of stringer boards 50 and deck boards 52 so that a partially assembled pallet can be made. The jigs can best be seen in FIG. 6a.

The inverter 28 includes a cross-piece 54 to which a corner clamp jig 56 is adjustably mounted. Lateral spacing of the stringer boards 50 can, thereby, be varied.

Figure 6A:
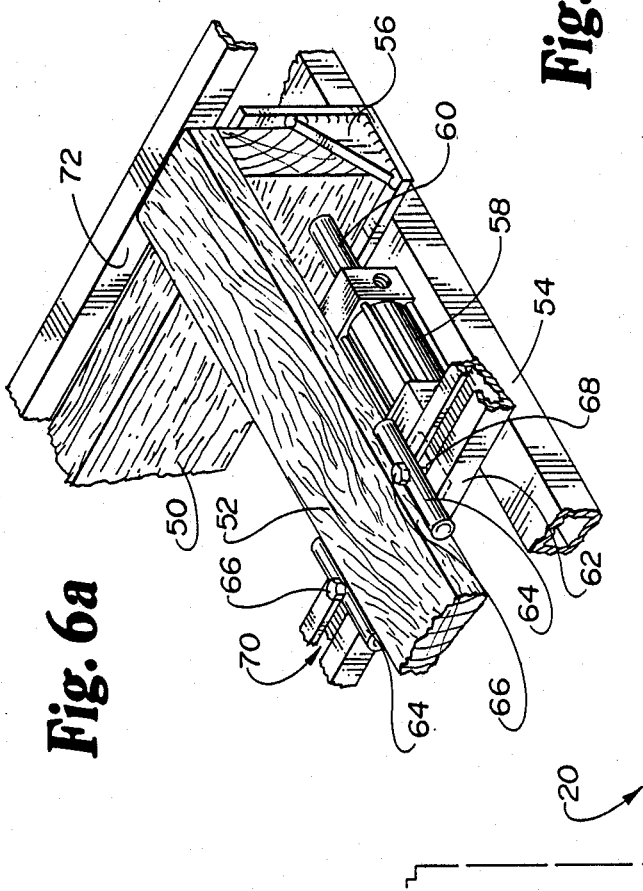
FIG. 6a is an enlarged fragmentary pictorial detailed view of a typical corner of the first station.
Figure 9:
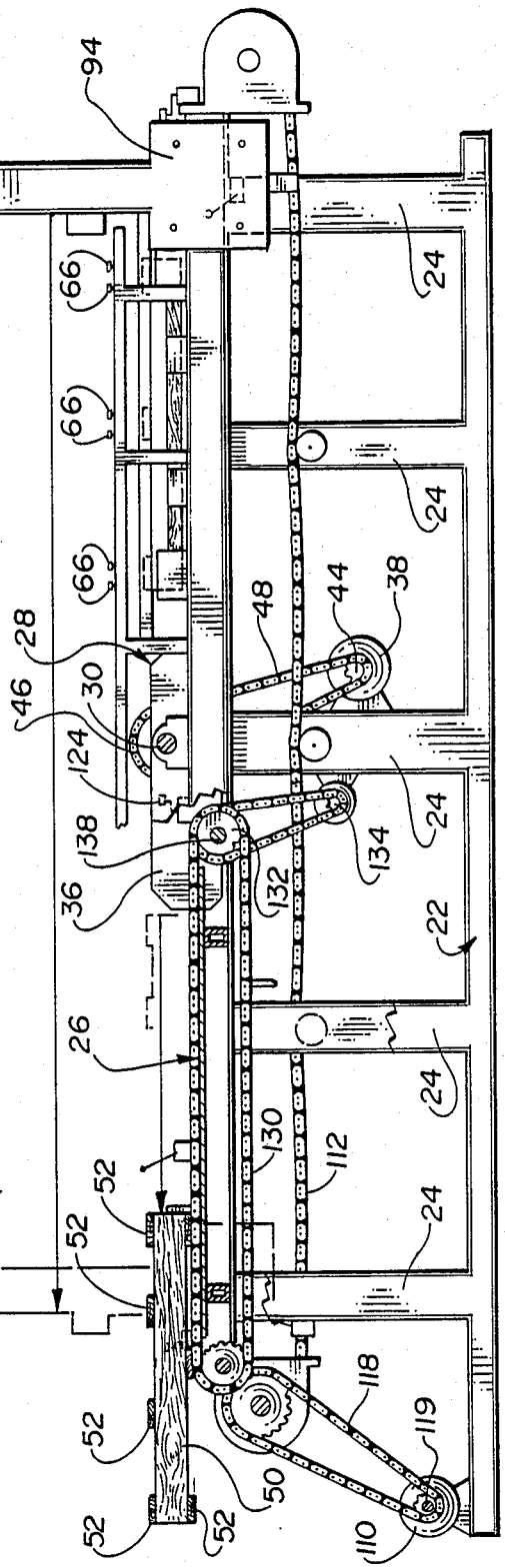
FIG. 9 is a side elevational view showing the movement of a finished pallet from the apparatus after its completion.
Figure 10:
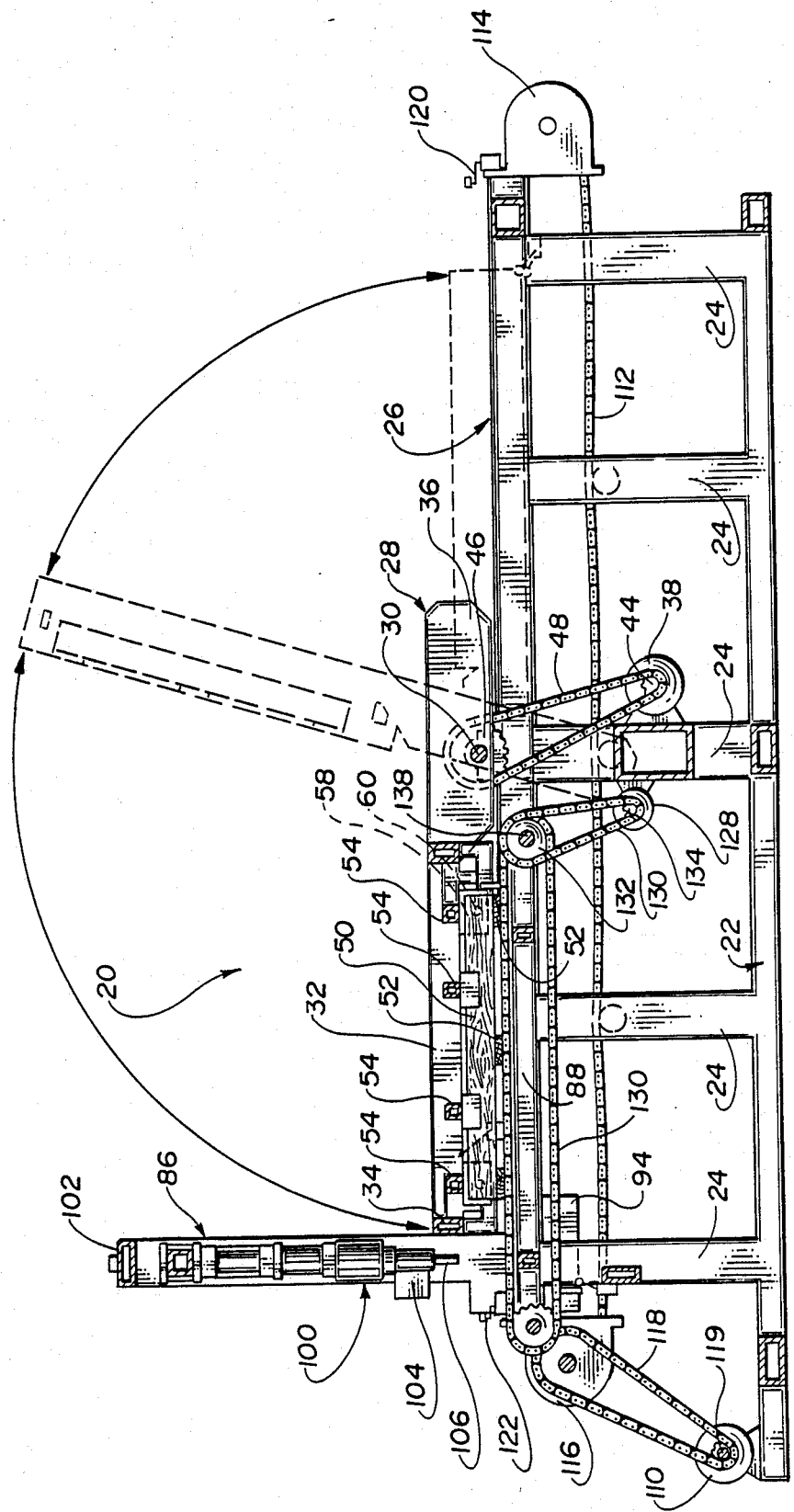
FIG. 10 is a side elevational sectional view, similar to that of FIG. 3, illustrating the pivoting of the inverter means.

As seen in FIG. 6a, a stringer 50 is fitted into each corner clamp jig 56. A point clamp cylinder 58 having a piston 60 engageable with a stringer 50 is provided to hold each stringer board 50 in place within the corner clamp jig 56 while the inverter 28 is in its first position. The piston 60 is actuable in any appropriate manner, and it is envisioned that it would be extended to engage and pin a stringer board 50 between the piston 60 and the corner clamp jig 56 until it would be desired to release a partially formed pallet when depositing that assembled structure into the second station.

The inverter 28 also includes at least one channel brace 62 which extends generally transverse to a crosspiece or cross-pieces 54. A plurality of pairs of side bar jigs 64 are slideably disposed within the channel brace 62 and can be secured at various axial positions therealong by a clamping screw 66 passing through an aperture in one of the side bar jigs 64 and an aperture in a cooperating plate 68 received within the channel 70 of the brace 62. The number of pairs of side bar jigs 64 employed will depend upon the number of deck boards 52 to be secured to first sides of the stringers 50.

Each pair of side bar jigs 64 will be fixedly positioned at locations so that a deck board 52 can be received therebetween, held at the appropriate location, and prevented from moving in a direction along an axis of elongation of the stringers 50. It will be understood, in view of this disclosure, that these locations can be varied, as can be the distance between the side bar jigs 64.

Movement of the deck boards 52 in a direction generally parallel to their axes of elongation can be precluded by the employment of an end plate jig 72 at opposite sides of the inverter 28. As seen in FIG. 6a, each end plate jig 72 can be carried by a corner clamp jig member 56 and disposed at a height so that it can be engaged by the ends of the deck boards 52. It will be understood that, as the corner clamp jigs 56 are adjusted transversely, end plate jigs 72 will be also.

The second station at the output end of the bed 26 is provided with tooling for receiving a partially formed pallet, from the inverter 28, and deck boards 52 to be applied to second sides of the stringers 50. Such tooling includes a plurality of fittings for holding the partially formed pallet and deck boards 52 to be applied to the second sides of the stringers. These fittings include a jig channel member 74 at either side of the output end of the bed 26. Each jig channel member 74 is similar to that employed at the input section (that is, the first station). These jig channel members 74 are disposed for movement laterally outwardly from positions at which they would engage the outermost stringers 50 of a partially assembled pallet, when such an assembly is deposited in the second station. Once a switch (not shown) senses that such a partially assembled pallet has been received in the second station, the jig channel members 74 would be actuated to move inwardly to engage the outermost stringers 50.

Each jig channel member 74 is provided, as in the case of the inverter 28, when it is in its first position, with a plurality of side bar jigs 78. These side bar jigs 78 are secured to the jig channel 74 in a manner similar to those of the inverter 28, and they can be adjusted longitudinally along the jig channel 74 at various desired positions using a clamping screw 80 and cooperating plate 82 received within the channel 84. The side bar jigs 78 are tightened in locations so that opposite jigs of a pair are spaced from one another at a distance to accomodate a deck board 52. The positioning of pairs along the jig channel member 74 is in accordance with a desired positioning of the deck boards 52 along the stringer 50.

The apparatus 20 includes a nailing tower 86 which traverses the bed 26 and is disposed for reciprocal movement longitudinally along an axis along which the first and second stations are aligned. A rail 88 is provided on either side of the bed 26, each rail 88 having, in the preferred embodiment, a V-track 40 projecting both upwardly and downwardly from a side frame 92 of the rail 80. The tower 86, on each side of the bed 26, includes a carriage 94 which vertically straddles a corresponding a rail 88. Each carriage 94 has upper and lower trolley wheels 96 which are mounted for rotation about generally horizontal axes, the trolley wheels 96 having V-shaped outer surfaces 98 which are complementary to the V-tracks 90 on which the wheels 96 ride. The wheels 96 are spaced vertically from one another at a distance so that, when the upper wheel is seated on its V-track 90, the lower wheel will also receive, within its outer surface, the downwardly extending V-track 90.

Typically, pallets are formed employing three stringer boards 50. When the pallet is to be so formed, three nailer guns 100 would be carried by an upper horizontal member 102 of the tower 86. The lateral positioning of the nailer guns 100 would depend upon the size of the pallet to be formed, the nailer guns 100 being adjustable transverse to the direction of movement of the tower 86 so that the paths of the nailer guns 100, as the tower 86 moves along the bed 26, overlie the stringers 50. This relative positioning of the nailer guns 100 with respect to the stringers 50 is best seen in FIG. 4.

It will be understood that the specific locations of the nailer guns 100 can be varied. Further, if desired, nailer guns 100 can be added or removed from the tower 86 should special pallets be desired to be assembled.

FIG. 7 illustrates an individual nailer gun 100. Each gun 100 is provided with a magazine 104 in which a multiplicity of nails are received. Individual nails are dispensed to a nail driver 106, and they are ejected and embedded through a deck board 52 into an underlying stringer 50 at the appropriate location by the driver 106.

It will be understood, in view of this disclosure, that the tower 86 can be provided with an optic proximity switch 108 which rides a path over the jig channels 62, 74 which form, respectively, part of the first and second stations. Triggering of the nailer guns 100 can be effected, therefore, as the proximity switch 108 senses a clamping screw 66 by which a side bar jig 64 is secured in position.

Longitudinal movement of the tower 86 is accomplished by means of a drive motor 110. An endless chain 112, extending the length of the bed 26 of the apparatus 20 and to which the tower 86 is fixedly secured, is run over sprockets 114, 116 journaled at either end of the bed 26. The sprockets 114, 116 are disposed for rotation about corresponding axes, and the sprocket 116 proximate the output end of the bed 26 is, in turn, driven by another endless chain 118 from a sprocket 119 at the motor 110.

In operation, the tower 86 starts at the output end of the bed 26. The inverter 28 is in its first position overlying the input end of the bed 26, and stringer and deck boards 50, 52 are fitted into the jigs 56, 64, 72 in the upwardly-facing surface of the inverter 28.

A control panel 121 is operated to initiate movement of the tower 86 toward and passed the input end of the bed 26. As the tower 86 passes the jig configuration, the deck boards 52 which were previously lain over stringer boards 50 in the inverter jigs 56, 64, 72 will be secured to the stringers 50. When the tower 86 passes the first station, it will trip a switch 120 which signals the tower drive motor 110 to reverse and return the tower 86 to its home position.

A second sensor switch 122 will ascertain when the tower 86 has returned to its home position. With this known, a signal will be transmitted to the inverter motor 38 to pivot the inverter 28 from its first position to its second position in order to deposit the now partially formed pallet into the second station.

Once the partially formed pallet is released into the second station, the inverter 28 will be pivoted in an opposite direction back to its normal position overlying the first station. Thereafter, deckboards 52 will be placed over the second sides of the stringers 50 of the partially formed pallet in the second station, and deckboards 52 and stringers 50 will again be placed into the jigs 56, 64, 72 carried by the inverter 28. Typically, this will be done manually, and the control panel can include one or more dead-man switches to preclude inadvertent operation of the equipment 20 while an operator is placing the various boards into position.

Once the machine 20 has received the various deck boards 52 and stringers 50, the tower 86 can, again, be run in a single pass over the two stations. As will be able to be seen in view of this disclosure, therefore, both the first and second stations can be configured concurrently in order to save time. One pass of the tower 86 will accomplish a function, therefore, in both stations.

As the tower 86 is initiated, again, and passes the second station, a switch 124 can sense that the tower 86 has passed. The switch 124 provided for this purpose can be located at an appropriate location, and, once passage of the tower 86 is ascertained, a flight 126 engaging the now completed pallet can be actuated in movement to urge the completed pallet onto a conveyor (not shown) for subsequent disposition.

Actuation of the flight 126 is effected by a third motor 128. The motor 128 is in train with the flight 126 by means of an endless chain 130 passing over sprockets 132, 134 attached to a shaft 136 of the motor 128 and a shaft 138 of a sprocket 132 driving an endless chain 140 to which the flight 126 is attached.

After the tower 86 passes the output section and the second station thereof, it will continue in its passage over the input section and the first station thereof. As it so continues, it will secure the deck boards 52 to the stringers 50 that are in the jigs 56, 64, 72 carried by the inverter 28. As previously indicated with regard to the partial formation of the first pallet to be manufactured serially, a limit switch 120 will sense when the tower 86 finishes traversing the first station. When this condition is sensed, reversal of the motor 110 driving the tower 86 will be accomplished, and the tower 86 will return to its home position. Return of the tower 86 will be sensed to actuate the inverter motor 38 to accomplish inversion of the pallet partially formed in the first station on the last swing of the tower 86. The second station will, of course, be vacant, since, when the tower 86 on the previous swing had passed the second station, the flight 126 was actuated to urge a completed pallet out of the second station and onto, for example, a conveyor (not shown) for subsequent disposition.

Numerous characteristics and advantages of the invention covered by this document have been set forth in the foregoing description. It will be understood, however, that this disclosure is, in many respects, only illustrative. Changes may be made in details, particularly in matters of shape, size, and arrangement of parts without exceeding the scope of the invention. The invention's scope is, of course, defined in the language in which the appended claims are expressed.

What is claimed is:

1. Apparatus for forming a pallet from a plurality of stringer boards and a plurality of deck boards to be applied to each of opposite sides of the stringer boards, comprising:
    (a) a bed having an input section and an output section spaced linearly from said input section along an axis of said bed;
    (b) inverter means mounted for pivotal movement between a first position, overlying said input section, and a second position, overlying said output section:
    (c) means, carried by said inverter means, for mounting, when said inverter means is in said first position, a plurality of the stringer boards and a plurality of deck boards to be applied to a first side of the stringer boards;
    (d) tooling, overlying said output section, for receiving a partially formed pallet from said inverter means when said inverter means is pivoted from said first position thereof to said second position thereof, and deck boards to be applied to a second side of the stringer boards;
    (e) means for pivoting said inverter means from said first position thereof to said second position thereof; and
    (f) means, reciprocable along said axis, for securing, when the inverter means is in said first position, deck boards to the first sides of stringer boards in said mounting means to partially form a pallet, and deck boards to the second sides of stringer boards of a previously partially formed pallet received in said tooling, to complete the pallet.

2. Apparatus in accordance with claim 1 further comprising means for conveying a completed pallet at said output section of said bed away from the apparatus.

3. Apparatus in accordance with claim 1 wherein said input section is closely proximate said output section.

4. Apparatus in accordance with claim 1 wherein said securing means comprises a transfer carriage oriented generally transverse to said axis, and a plurality of nailer guns carried by said transfer carriage and spaced along an axis generally perpendicular to said axis of said bed.

5. A method of forming a pallet from a plurality of stringer boards and a plurality of deck boards to be applied to each of opposite sides of the stringer boards, comprising the steps of:
    (a) providing a frame and pivotally mounting the frame for movement between a first position, defining a first station, and a second position, defining a second station;
    (b) mounting a plurality of stringer boards on an upwardly-facing side of the frame when it is in its first position and placing a plurality of deck cards over first sides of the stringer boards;
    (c) providing means, reciprocable along an axis along which the first and second stations are aligned, for securing the deck boards to the stringer boards as it reciprocates along the axis;
    (d) moving the securing means along the axis to secure the deck boards to the first sides Of the stringer boards to partially form a pallet at the first station;
    (e) pivoting the frame to deposit the partially formed pallet into the second station in an inverted disposition;
    (f) repeating step (b), and placing a plurality of deck boards over second sides of the stringer boards of the partially formed pallet in the second station;
    (g) moving the securing means a singled pass along the axis to secure the deck boards to the first sides of the stringer boards in the first station, and to complete the pallet in the second station by securing the deck boards to the second sides of the stringer boards of the partially formed pallet.

6. The method of claim 5 comprising the further step of removing the completed pallet from the second station.

7. The method of claim 6 comprising the further steps of sequentially repeating steps (e), (f), and (g).

* * * * *